Patented July 20, 1937

2,087,401

UNITED STATES PATENT OFFICE 2,087,401

PROCESS OF MAKING BITUMINOUS EMULSIONS

William F. Fair, Jr., New York, N. Y., assignor to The Barrett Company, New York, N. Y., a corporation of New Jersey No Drawing. Application February 9, 1934, Serial No. 710,533

2 Claims. (Cl. 134—1)

This invention relates to emulsions or dispersions of bituminous materials, and more particularly, to coal tar emulsions and methods for producing the same.

Heretofore, emulsions of asphalts have been made and used for surfacing roads, curing concrete, protecting iron work, etc. In some instances, light tars have also been emulsified. Heavy coal tars, that is coal tars having a specific gravity of from 1.18, or even as low as 1.15, to 1.25 or higher at 25° C. have not been successfully used in producing emulsions prior to the invention of my copending application Serial No. 628,113, filed August 9, 1932, for the reason that emulsions of such tars when produced by processes such as are used in producing asphaltic emulsions are relatively unstable so that the tar soon settles out of suspension.

Coal tars generally are of higher specific gravity than asphalts and this property may account, in part at least, for the comparative instability of emulsions or dispersions of coal tars as heretofore produced. Among the factors which influence the stability of emulsions and tend to cause settling out of the material dispersed are differences in density of the disperse phase and the continuous phase and differences in viscosity of the two phases or a combination of these factors with others. It has been proposed to increase the stability of emulsions or dispersions of bituminous materials by (1) increasing the density of the aqueous phase and (2) by decreasing the density of the disperse phase. Method (1) has been practiced heretofore by adding clay or the like to the aqueous phase prior to the dispersion of the bituminous material. However, the resulting dispersion then contains undesired inert inorganic material. Method (2) has been used by cutting back the bituminous material with a sufficient amount of a light organic solvent to reduce the density and viscosity of the material dispersed. This method, it will be noted, requires the use of substantial amounts of relatively expensive solvents and changes the physical properties of the bituminous phase.

Among the objects of this invention are to produce bituminous emulsions of improved stability, and particularly, coal tar emulsions or dispersions of improved stability; to provide an inexpensive and simple method by which such emulsions or dispersions can be made and to produce such emulsions without incorporating objectionable inert inorganic materials therein. These and other objects of this invention will appear from the following description thereof.

In my copending application, hereinabove referred to, there is disclosed a procedure of making coal tar emulsions involving the formation of an initial emulsion by dispersing a relatively small amount of a suitable easily-emulsifiable bituminous material, such as asphalt, in an aqueous medium and then adding to this initial emulsion relatively heavy coal tar or water gas tar. Asphalts, asphalt flux oil, petroleum, fuel oil, or other asphaltic or petroleum bitumens may be employed as the bituminous material for the disperse phase of the initial emulsion. Preferably, asphalt having a penetration at 77° F. of from 100 to 220 tenths of a millimeter (determined by A. S. T. M. Standard Method D5-25) is utilized. A relatively heavy coal tar having a specific gravity of not less than 1.15 at 25° C. and a viscosity of not less than approximately 60 seconds for 100 c. c. at 100° C. or a relatively heavy water gas tar having a viscosity of not less than approximately 60 seconds per 100 c. c. at 100° C. is dispersed in the initial emulsion. Heavier and more viscous coal tars, including coke oven, vertical and horizontal retort tars, water gas tar, or other relatively heavy bituminous material of different characteristics from that forming the disperse phase of the initial emulsion may be added to the initial emulsion.

In producing such emulsions, preferably a soap or saponaceous material is employed as a dispersing agent to aid in the production of both the initial and the final emulsion. The soap-forming materials may be added to the aqueous medium and to the bituminous material to be dispersed so that a reaction between the soap-forming materials which results in the formation of soap takes place during the emulsification of the bituminous material. Preferably, the basic constituent of the soap is added to the aqueous medium in which it is readily soluble and the acidic constituent is added to the material to be dispersed, although, if desired, the soap emulsifier, as such, or soap-forming constituents may be added to the emulsion during its formation or immediately after the addition of the bituminous material to the aqueous medium and during the agitation of the mixture. Ammonium or sodium soaps of fatty acids or mixtures of fatty acids, sodium resinate, the reaction product of sodium silicate and oleic acid, the sodium salts of sulfonated coumarone resin and associated sulfonated coumarone-like compounds or the sodium salts of other sulfonated benzene derivatives may be employed as dispersing agents.

Emulsions of asphalts and readily emulsifiable bituminous materials may be produced by adding the bituminous material in molten form to an aqueous medium while stirring. Soap-forming reagents may be mixed with the bituminous material and aqueous medium so that upon admixture of these materials, the dispersing agent is formed. In such emulsification procedures, as well as the procedure of my copending application hereinabove referred to, in all cases, it has been the practice to introduce either the total amount of emulsifier directly into the emulsion or to form the total amount of dispersing agent in situ by adding the total amount of soap-forming constituents to the dispersed and continuous phases and causing them to react during the emulsification of the asphaltic bitumen or coal tar. The final emulsion obtained by mixing the coal tar with the initial emulsion was usually subjected to treatment in a colloid mill of any suitable type to disperse the bituminous material uniformly throughout the aqueous medium in the form of very minute particles.

This invention is in the nature of an improvement on the emulsification procedures hereinabove described. I have found that if, instead of adding the total amount of emulsifier, e. g., fatty acid soap or fatty acid soap-forming constituents, to the emulsion at the beginning or during the emulsification procedure, as has heretofore been customary, only a portion, say from 50 to 75 per cent of the total emulsifier is first introduced and the emulsion formed and the remainder of the emulsifier is added after the emulsion thus formed is passed through a colloid mill, an emulsion of improved stability results. Emulsions made by this method have been found to be slower-breaking than those in which all the emulsifying agent is added at one time.

Slow-breaking emulsions are admirably suited for many uses, among which may be mentioned production of road aggregate involving the coating of crushed stone with an emulsion, followed by the coating of the emulsion-treated stone with a bituminous binder. The use of a slow-breaking emulsion for the initial treatment of porous stone results in increased penetration of the pores of the stone by the emulsion with consequent improvement in the bond between the bitumen of the emulsion and the stone. If the usual relatively quick-breaking emulsion were used to treat stone, upon contact with the stone the emulsion would break, resulting in only a surface coating of the stone with the bitumen of the emulsion and not in the penetration of the pores of the stone by the bitumen.

In practice, it has been found that an emulsion made in accordance with my invention breaks much more slowly than an emulsion in which the constituents thereof are in the same proportions but which was prepared by the addition of all of the emulsifying agent or constituents forming the emulsifier during the initial stages of preparation of the emulsion.

The total quantity of emulsifying agent employed in making the emulsion of this invention may vary from 0.5 to 5 per cent by weight of the emulsion. The emulsifying agent employed should be of the type which lowers the surface tension of the continuous phase. Sodium salts of fatty acids and rosin acids are preferred. The quantity of soap added in the second stage of the process may vary from a trace to 2.5 per cent by weight of the emulsion.

In order that my invention may be more fully understood, the following example of a preferred method of producing an emulsion in accordance therewith is given:

An initial emulsion is produced by mixing 1.5 per cent by weight of oleic acid, based on the weight of the completed emulsion, with 10 per cent by weight of asphalt flux oil having a specific gravity of 1.04 and a viscosity of less than 500 seconds for 100 c. c. at 150° C. This mixture is heated to about 100° C. and poured into 29.3 per cent by weight of water to which has been added 0.2 per cent by weight of caustic soda. The materials are vigorously agitated to produce an initial emulsion of asphalt in sufficient water to form the final emulsion. To the initial emulsion of asphalt thus produced is added 58 per cent of liquefied coal tar having a melting point of approximately 80° F. The emulsion is vigorously agitated during the incorporation of the coal tar, the temperature of the emulsion thus formed falling within the range of from 180 to 195° F. The emulsion thus produced is subjected to treatment in a colloid mill, such as the "Charlotte" mill. To this emulsion is added 1 per cent of oleic acid and sufficient caustic so that it reacts therewith to form sodium oleate. During the addition of the additional fatty acid and caustic, the emulsion is stirred. An emulsion of improved stability will result. By stable emulsion is meant one which does not break or invert readily and which settles very little on standing for relatively long periods of time, say three days or longer. For example, the stable emulsion of my invention can be passed through a colloid mill such as a "Charlotte mill" without breaking or inverting and will not break on storage or while in transit for long periods of time.

The term "coal tar" as used in the specification and claims includes raw coal tar, dehydrated coal tar, and stripped coal tar from which a portion of the volatile constituents have been removed. The term "emulsion" is used herein in a broad sense and is intended to include suspensions or dispersions in which the disperse phase is constituted of finely divided solids as well as of liquids.

It will be understood that the invention is not limited to the specific materials or to the preferred form of the invention referred to herein by way of illustration and should not be restricted to the present disclosure otherwise than defined by the appended claims.

I claim:

1. In a process of producing a stable emulsion the disperse phase of which is constituted predominantly of tar of the group consisting of coal tar and water gas tar and a small amount of asphaltic bitumen, and the continuous phase of which is constituted of an aqueous medium and an emulsifying agent, the steps comprising producing an initial emulsion of the asphaltic bitumen in said aqueous medium in the presence of a portion of said emulsifying agent, dispersing an amount of the tar of the group consisting of coal tar and water gas tar greater than the amount of the asphaltic bitumen directly in said initial emulsion and adding additional emulsifying agent directly to the emulsion thus formed, thereby obtaining a more stable emulsion than if all of the emulsifying agent were present during the said dispersing of the tar.

2. In a process of producing a stable emulsion containing as the disperse phase a relatively large amount of tar of the group consisting of coal tar and water gas tar of a specific gravity of at least 1.15 and a smaller amount of asphalt, and the continuous phase of which contains an aqueous solution of soap emulsifying agent, the steps comprising producing an initial emulsion containing an aqueous medium and a relatively small amount of asphalt in the presence of a portion of said emulsifying agent, then adding tar of the group consisting of coal tar and water gas tar of a specific gravity of at least 1.15 directly to the asphalt emulsion while agitating the emulsion, and after the addition of the tar adding to the resultant emulsion additional emulsifying agent, thereby obtaining a more stable emulsion than if all the emulsifying agent were present during said addition to the coal tar.

WILLIAM F. FAIR, Jr.

CERTIFICATE OF CORRECTION.

Patent No. 2,087,401.  July 20, 1937.

WILLIAM F. FAIR, JR.

It is hereby certified that error appears in the printed specification of the above numbered patent requiring correction as follows: Page 3, second column, line 6, claim 2, for "to" read of; and that the said Letters Patent should be read with this correction therein that the same may conform to the record of the case in the Patent Office.

Signed and sealed this 5th day of October, A. D. 1937.

Henry Van Arsdale (Seal) Acting Commissioner of Patents.